March 13, 1951  H. ANDERSON  2,545,187
TURBINE CONTROL APPARATUS
Filed Sept. 27, 1949  4 Sheets-Sheet 1

FIG.I.

WITNESSES:
V. W. Novak
D. J. McCarty

INVENTOR
Harold Anderson
BY
A. B. Revers
ATTORNEY

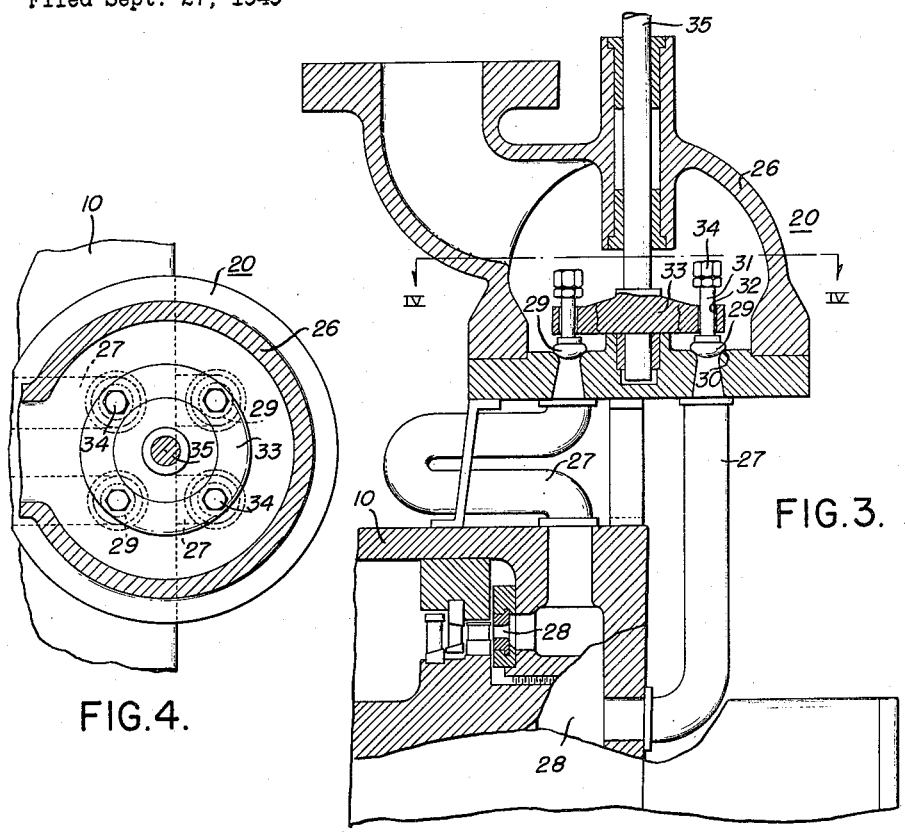
FIG.3.
FIG.4.
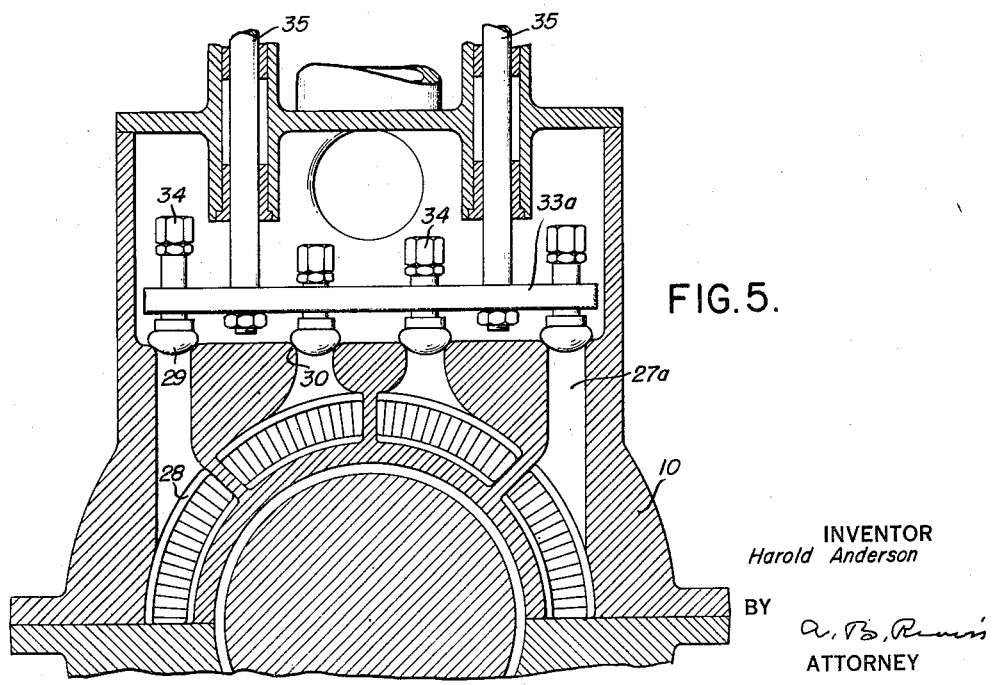
FIG.5.
INVENTOR
Harold Anderson
BY
ATTORNEY

INVENTOR
Harold Anderson

Patented Mar. 13, 1951

2,545,187

UNITED STATES PATENT OFFICE 2,545,187

TURBINE CONTROL APPARATUS

Harold Anderson, Lansdowne, Pa., assignor to Westinghouse Electric Corporation, East Pittsburgh, Pa., a corporation of Pennsylvania Application September 27, 1949, Serial No. 118,087

3 Claims. (Cl. 253—39)

This application is a continuation-in-part of application Serial No. 33,709, filed June 18, 1949, for turbine control.

The invention relates to elastic fluid turbines, more particularly of the marine propulsion type, and it has for an object to provide for control of the supply of motive fluid thereto in a simplified manner and so as to secure more efficient performance.

Steam supplied to a geared marine turbine is usually controlled by a throttle valve, an overspeed governor valve, and a number of manually-operated nozzle valves. While such an arrangement is capable of efficient operation over a relatively wide power range, the manually-operable nozzle control valves are frequently left wide open and the power is controlled by operation of the throttle valve, this being particularly true when navigating in restricted waters or in foggy weather, when full power may be required at a moment's notice. Such operation results in increased fuel consumption. Aside from reduced efficiency due to the improper operation of the nozzle control valves, the conventional arrangement involves losses due to the pressure drop across each of the valves, including the throttle valve, the overspeed governor valve, and the nozzle control valves arranged in series. In accordance with the present invention, instead of three such valves, the functions thereof are achieved by a single valve, in consequence of which, not only are the throttling losses reduced, but the structure essential for controlling the supply of steam to the turbine is simplified and of a design susceptible to more economical production and installation.

A more particular object of the invention is to provide nozzle control valves which are opened and closed in succession by upward and downward movement of a lifter effected by manual operation of a lever about a fulcrum positioned by oil under pressure, which is relieved in response to overspeed operation or loss of lubricating oil pressure so that a spring then becomes effective to close the steam valves regardless of their position. By having the flow of steam controlled by a plurality of successively opened and closed nozzle control valves, it will be apparent that throttling losses may thereby be reduced. Furthermore, it will be apparent that the turbine cannot be started unless the lubricating oil pressure is at or above a predetermined value.

A further object of the invention is to provide a lifter and valve arrangement wherein the lifter is raised and lowered by a lever which is operated manually about a fulcrum normally held in operating position by oil under pressure and which pressure of oil is relieved in response to overspeeding of the turbine or insufficient bearing oil pressure to enable a spring to become effective to close open valves in succession.

The foregoing and other objects are effected by the invention as will be apparent from the following description and claims taken in connection with the accompanying drawings, forming a part of this application, in which:

Fig. 3 is an enlarged vertical detail, sectional view of the valve arrangement of Fig. 2;

Fig. 4 is a detail horizontal, sectional view of the valve arrangement shown in Fig. 3;

Fig. 5 is a view similar to Fig. 3 but showing a modified form of steam chest, valve arrangement, and nozzle passages.

Figure 1:
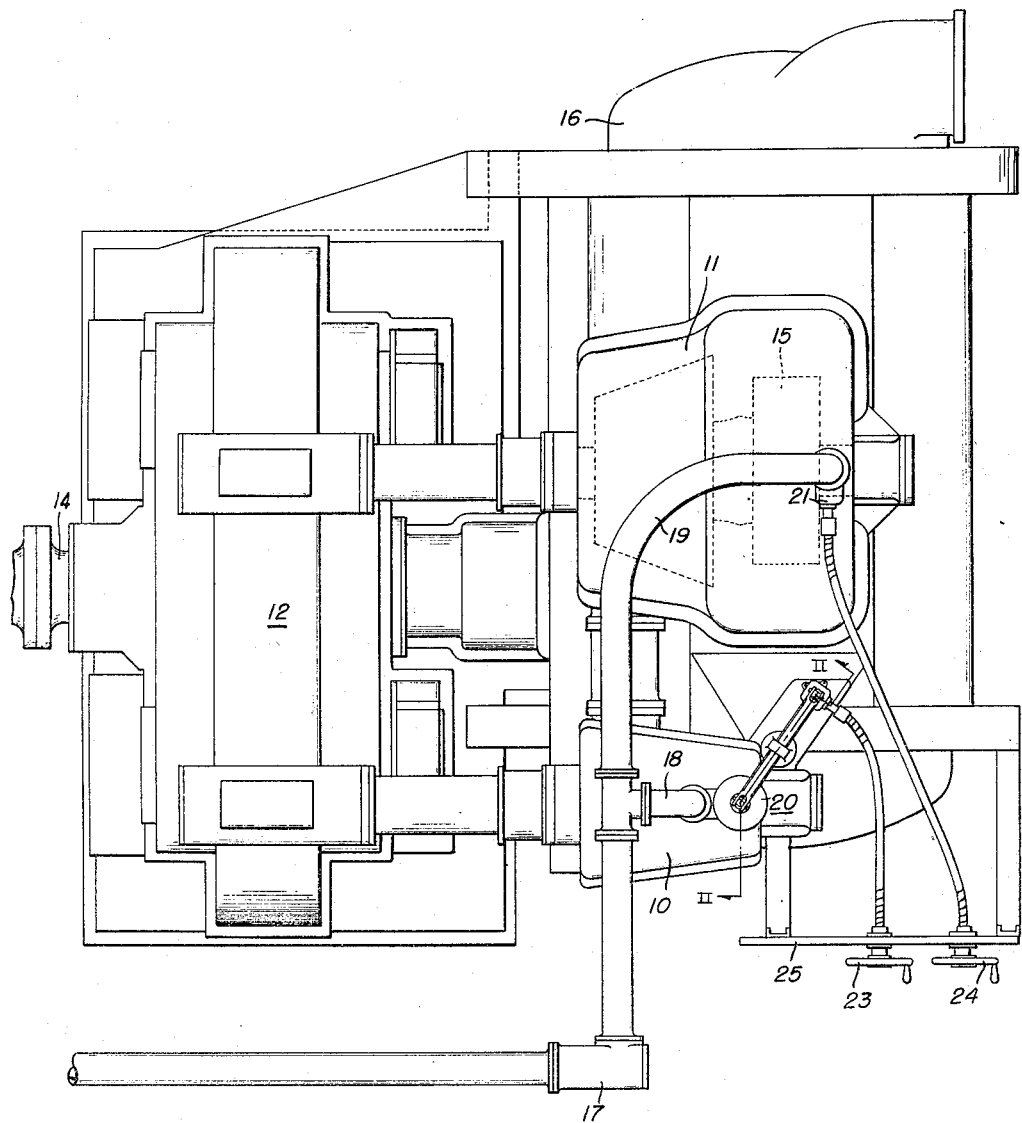
Fig. 1 is a plan view of a marine propulsion plant having the invention applied thereto.

In Fig. 1, there is shown a marine propulsion plant including a high-pressure turbine 10 and a low-pressure turbine 11 connected by reduction gearing, at 12, to a driven shaft 14 for coupling to a propeller shaft. The low-pressure turbine incorporates a reversing or astern section 15. Steam exhausting from the low-pressure ahead turbine section or from the astern turbine section is preferably supplied to the condenser 16.

Steam from the boiler passes through the strainer 17 and then is conducted through either the supply passage 18 for the cross connected ahead turbine arrangement or the supply passage 19 for the astern turbine section. The ahead and astern turbine supply passages 18 and 19 are provided with valves, at 20 and 21, respectively, carried by the turbines and which are controlled by handwheels 23 and 24 mounted on the control board 25, also carried by one of the turbines or by the unitary propulsion plant.

The valve, at 20 (Figs. 2, 3 and 4), includes a housing or chest 26 connected by a plurality of passages 27 to separate nozzle groups 28. Flow of steam through each passage is controlled by a plug valve 29 cooperating with a seat 30, and the plug valves 29 are operated so as to be successively opened and closed. To this end, the plug valves have stems 31 extending through openings 32 in the lifter 33 and abutments 34 carried by the stems 31 above the lifter provide for opening of the valves, the abutments being spaced at relatively different distances above the lifter so that the valves may be successively opened and closed as the lifter is traversed upwardly and downwardly.

The lifter 33 has a stem 35 pivotally connected, at 36, to one end of the operating lever 37. Between the ends of the operating lever, a fulcrum, at 38, is established by the rod 39 pivotally connected to the lever and cooperating with the stop 40, the rod forming a part of the piston aggregate, at 41, normally maintained, by fluid under pressure, in fulcrum-establishing position so that movement of the operating lever about the fulcrum axis raises and lowers the lifter for successive opening and closing of the valves. Movement of the operating lever for this purpose is accomplished by means of an actuator, at 42, including a link 43 pivotally connected at 44 to the end of the lever remote from the pivotal connection 36.

The link 43 is traversed longitudinally to move the operating lever by operation of handwheel 23 of the actuator. To this end, the link has a threaded portion 45 meshing with the internally-threaded hub of the gear 46 pivoted against axial movement and driven by the gear 47 rotated by turning the handwheel 23.

The piston aggregate, at 41, includes a piston portion 48 in the cylinder 49 supplied with oil under pressure to hold the aggregate in the upper position, determined by the stop 40, against the force of the spring 50. If oil is allowed to discharge from the cylinder at a rate greater than it is being supplied thereto, then the spring 50 is thereby rendered effective to move the aggregate downwardly for movement of the operating lever about the outer pivotal connection 44 with respect to the actuator to move the lifter downwardly for successive closing of open plug valves.

The supply of oil under pressure to the cylinder 49 to keep the admission valve, at 20, open to the extent determined by adjustment of the handwheel 23 is made dependent upon overspeeding of the turbine being avoided and upon the lubricating oil pressure not declining below a predetermined value. To this end, there are provided valves, at 53, and, at 54, controlling communication of pressure supply and exhaust ports with the cylinder 49.

The valve, at 53, is biased by a spring 55 against pressure of oil developed by the impeller 56 driven by the turbine. As long as the turbine speed does not exceed a predetermined amount, the spring positions the valve to maintain the supply of oil under pressure to the cylinder 49 to keep the admission valve, at 20, open to the extent determined by handwheel adjustment; however, upon overspeeding, the impeller pressure increases to move the valve for reduction in oil pressure in the cylinder 49 to enable the spring to bring about closing movement of the admission valve.

The valve, at 54, is moved by pressure of oil of the lubricating supply line 57 acting against a spring 58. With the lubricating oil pressure above a predetermined value, it overcomes the spring 58 to position the valve to maintain the pressure of oil in the cylinder 49 to keep the admission valve, at 20, open; however, upon decline in lubricating oil pressure below the predetermined value, pressure of oil in the cylinder 49 is reduced and the spring 50 brings about closing movement of the admission valve.

While the valves, at 53, and, at 54, may be of any suitable type, as shown, they respectively include piston valve portions 59 and 60, the piston valve portion 59 controlling communication of the pressure supply and exhaust ports 61 and 62 with the cylinder port 63 and the piston portion 60 controlling communication of the pressure supply and exhaust ports 65 and 66 with the cylinder port 67. Pistons 68 and 69 are connected to the piston valve portions 59 and 60, respectively, and they are acted upon by impeller and lubricating oil pressures, respectively, to exert forces on the piston valve portions 59 and 60 in opposition to those of the springs 55 and 58.

As shown, the valves, at 53, and, at 54, are arranged in series between the pressure supply and the cylinder 49. As long as overspeeding is avoided and the lubricating oil pressure does not fall below a predetermined value, oil is supplied through the pressure supply and cylinder ports 61 and 63 to the passage 72, and, from the latter, through the pressure supply and cylinder ports 65 and 67 and the passage 73 to the cylinder 49. If overspeeding occurs, the increase in impeller pressure acts on the piston 68 to move the piston portion 59 against the spring 55 to effect communication of the cylinder port 63 with the exhaust port 62, whereupon the spring 50 becomes effective to move the admission valve in a closing direction. Likewise, the admission valve is moved in a closing direction upon decline in oil pressure, the spring 58 acting on the piston portion 60 to move the latter against the force of reduced lubricating oil pressure applied to the piston 69 to place the cylinder port 67 in communication with the exhaust port 66.

The valves, at 53, and, at 54, respectively, include settings 74 and 75 by means of which the spring forces may be varied to fix the speed beyond which the admission valve begins to close and the lubricating oil pressure below which such valve is closed.

Figure 2:
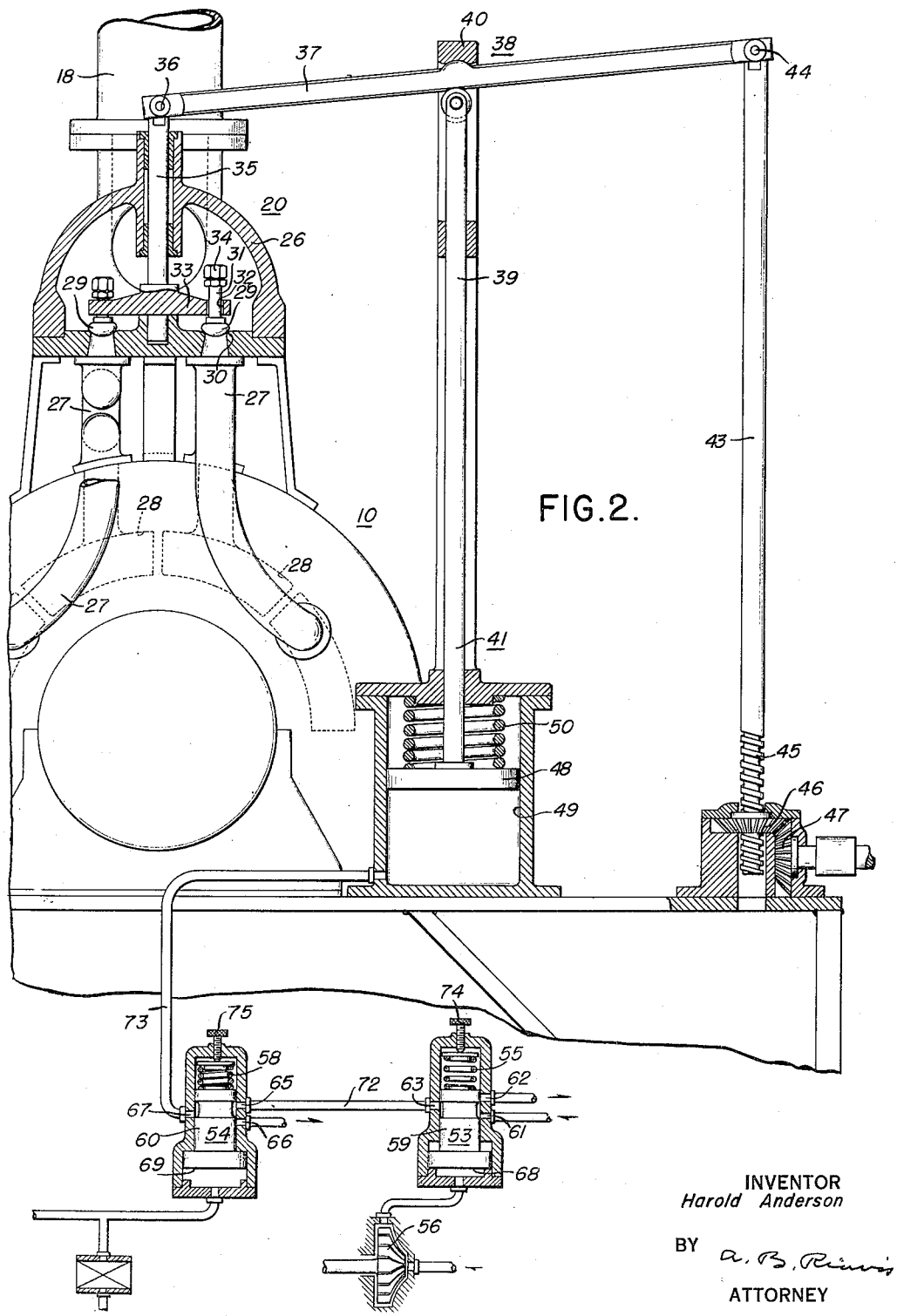
Fig. 2 is a sectional view taken along the line II—II of Fig. 1 and showing the operating lever mechanism with the improved valve arrangement.

The lifter may be of any suitable type. In Figs. 2, 3 and 4, it is of disc form and the steam chest is of circular outline, the steam chest having its bottom formed with a circular series of openings providing said plug valve seats 30 and connected by pipes 27 to separate nozzle chambers 28. In Fig. 5, as the steam chest has openings for the nozzle passages 27a arranged in line, such passages may readily be cast in nozzle box and steam chest structure and the lifter may take the form of a bar 33a.

Figure 6:
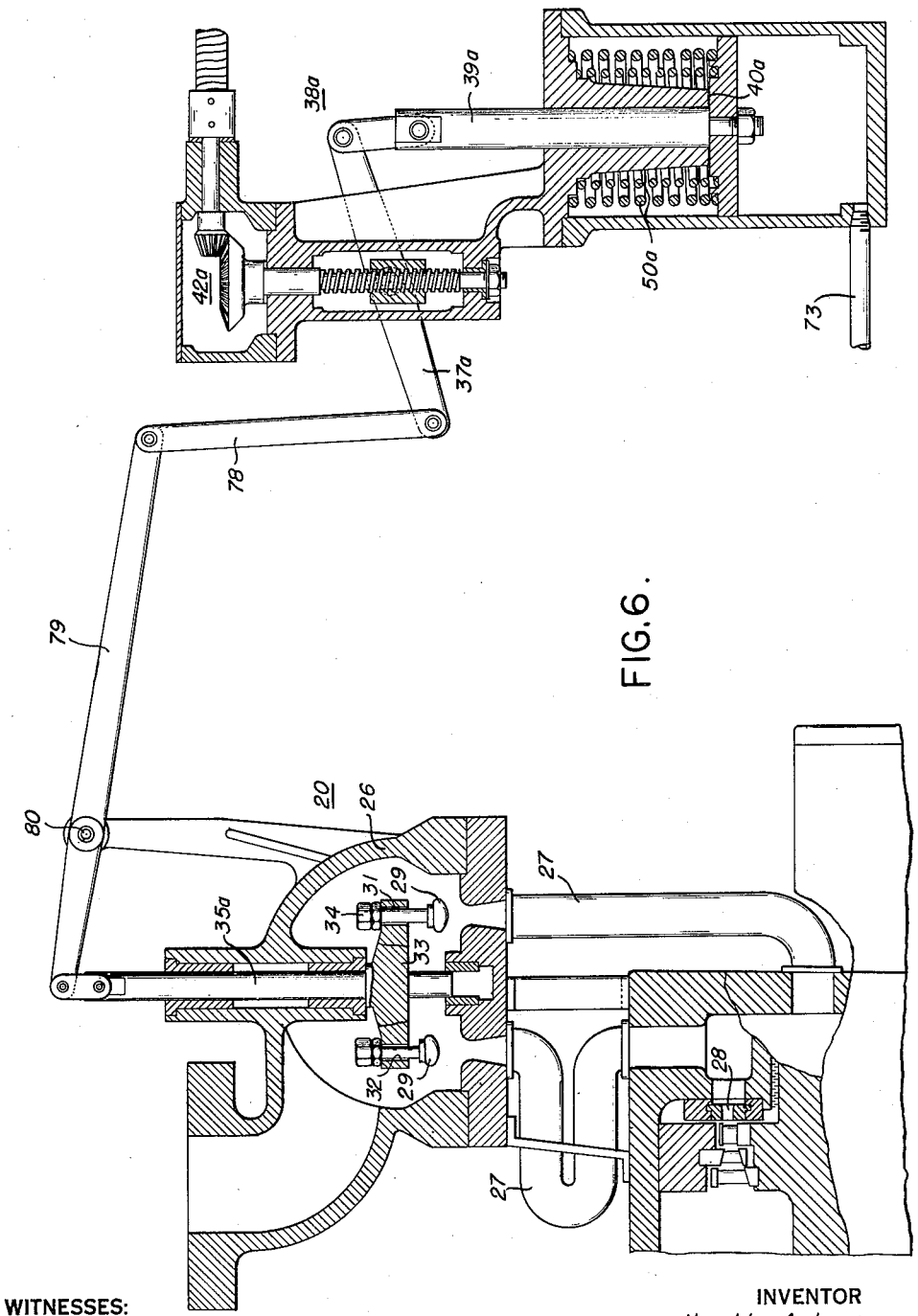
Fig. 6 shows a modified linkage arrangement for raising and lowering the lift member.

In Fig. 6, there is shown a modified form of linkage which is readily adaptable to suit variable space conditions found aboard ship. In this view, the linkage includes the lever 37a having one end pivotally connected by a link 78 to the lever 79, fulcrumed at 80 and pivotally connected to the lifter rod 35a. The other end of the lever is pivotally connected, at 38a, to the rod member 39a, normally engaging the stop 40a so that the pivotal connection, at 38a, becomes a fulcrum about which the lever 37a is tilted by the manually-operable actuator, at 42a, to open and close the valves. As before, the member 39a is held against the stop 40a by oil under pressure acting on the piston 48a against the force of the spring 50a.

From the foregoing, it will be apparent that I have devised a valve arrangement for controlling the operation of a marine turbine in a safe and economical manner. By having a valve arrangement made up of a plurality of plug valves which are successively opened and closed, it will be apparent that the throttling losses may be reduced as compared to the situation where a single valve is opened and closed for the same steam flow; and, as the manually-operable lever for opening and closing the plug valves in succession is also movable in response to decrease in lubricating oil pressure below a predetermined value or to increase in turbine speed beyond a predetermined amount, it will be apparent that, not only is the turbine thereby afforded the usual safeguards, but inability to open the plug valves until restoration of lubricating oil pressure above a predetermined amount assures that the turbine cannot be started until such lubricating oil pressure is reached. Furthermore, as compared to the conventional valve arrangement now commonly used with marine turbines, the present one is more efficient for the reason that, instead of three sets of valves in series with the pressure drops thereacross adding, the present invention involves only a single valve arrangement with the pressure drop thereacross substantially reduced.

While I have shown my invention in several forms, it will be obvious to those skilled in the art that it is not so limited, but is susceptible of various other changes and modifications without departing from the spirit thereof.

What I claim is:

1. In a turbine provided with a steam chest and a plurality of valves for controlling the flow of steam therefrom through separate passages to nozzle boxes, the combination of, a lift member operatively connected to the valves so that, as it is raised, the valves are successively opened and, as it is lowered, the valves are successively closed; a linkage mechanism for raising and lowering the lift member and including a lever; a stop; a member pivotally connected to the lever and movable to a position fixed by the stop so that the pivotal connection constitutes a fulcrum for the lever; a manually-movable actuator pivotally connected to the lever and operative to tilt the latter about the fulcrum to open and close the valves in succession; a spring exerting force on said member in the direction to move it away from the stop and tilt the lever about its pivotal connection with respect to its actuator for closing of open valves in succession; a cylinder; a piston in the cylinder and connected to said member; means for normally supplying oil under pressure to the cylinder to act on the piston to hold said member in the position fixed by the stop and against the force of said spring; and means responsive to overspeeding of the turbine to provide for discharge of oil from the cylinder so that the spring may move said member away from the stop to tilt the lever about its pivotal connection with respect to its actuator for closing of open valves in succession.

2. In a turbine provided with a steam chest and a plurality of valves for controlling the flow of steam therefrom through separate passages to nozzle boxes, the combination of, a lift member operatively connected to the valves so that, as it is raised, the valves are successively opened and, as it is lowered, the valves are successively closed; a linkage mechanism for raising and lowering the lift member and including a lever; a stop; a member pivotally connected to the lever and movable to a position fixed by the stop so that the pivotal connection constitutes a fulcrum for the lever; a manually-movable actuator pivotally connected to the lever and operative to tilt the latter about the fulcrum to open and close the valves in succession; a spring exerting force on said member in the direction to move it away from the stop and tilt the lever about its pivotal connection with respect to the actuator to close open valves in succession; a cylinder; a piston in the cylinder and connected to said member; means for normally supplying oil under pressure to the cylinder to act on the piston to hold said member in the position fixed by the stop and against the force of said spring; and means responsive to decline in turbine lubricating oil pressure below a predetermined amount to provide for discharge of oil from the cylinder so that the spring may move said member away from the stop to tilt the lever about its pivotal connection with respect to the actuator for closing of open valves in succession.

3. In a turbine provided with a steam chest and a plurality of valves for controlling the flow of steam therefrom through separate passages to nozzle boxes, the combination of, a lift member operatively connected to the valves so that, as it is raised, the valves are successively opened and, as it is lowered, the valves are successively closed; a linkage mechanism for raising and lowering the lift member and including a lever; a stop; a member pivotally connected to the lever and movable to a position fixed by the stop so that the pivotal connection constitutes a fulcrum for the lever; a manually-movable actuator pivotally connected to the lever and operative to tilt the latter about the fulcrum to open and close the valves in succession; a spring exerting force on said member in the direction to move it away from the stop and tilt the lever about its pivotal connection with respect to the actuator to close open valves in succession; a cylinder; a piston in the cylinder and connected to said member; means for normally supplying oil under pressure to the cylinder to act on the piston to hold said member in the position fixed by the stop and against the force of said spring; and means responsive to overspeeding of the turbine or to decline in turbine lubricating oil pressure below a predetermined amount to provide for discharge of oil from the cylinder so that the spring may move said member away from the stop to tilt the lever about its pivotal connection with respect to the actuator for closing of open valves in succession.

HAROLD ANDERSON.

No references cited.